United States Patent
Tokuda et al.

(10) Patent No.: US 11,340,128 B2
(45) Date of Patent: May 24, 2022

(54) PRESSURE SENSOR ELEMENT FOR MEASURING DIFFERENTIAL PRESSURE AND A DIAPHRAGM BASE HAVING A SET OF DIAPHRAGMS DISPLACED BY RECEIVING PRESSURES WHERE A SET OF PRESSURE INLET PASSAGES RESPECTIVELY TRANSMIT DIFFERENT PRESSURES TO THE SET OF DIAPHRAGMS

(71) Applicant: AZBIL CORPORATION, Tokyo (JP)

(72) Inventors: Tomohisa Tokuda, Chiyoda-ku (JP);
Masayuki Yoneda, Chiyoda-ku (JP);
Hirofumi Tojo, Chiyoda-ku (JP);
Ayumi Tsushima, Chiyoda-ku (JP);
Nozomi Kida, Chiyoda-ku (JP)

(73) Assignee: AZBIL CORPORATION, Tokyo (JP)

( * ) Notice: Subject to any disclaimer, the term of this patent is extended or adjusted under 35 U.S.C. 154(b) by 51 days.

(21) Appl. No.: 17/064,059

(22) Filed: Oct. 6, 2020

(65) Prior Publication Data
US 2021/0108980 A1 Apr. 15, 2021

(30) Foreign Application Priority Data
Oct. 9, 2019 (JP) .............................. JP2019-185769

(51) Int. Cl.
*G01L 15/00* (2006.01)
*G01L 19/00* (2006.01)
*G01L 19/06* (2006.01)
*G01L 13/02* (2006.01)

(52) U.S. Cl.
CPC ............ *G01L 15/00* (2013.01); *G01L 13/026* (2013.01); *G01L 19/0046* (2013.01); *G01L 19/0645* (2013.01)

(58) Field of Classification Search
None
See application file for complete search history.

(56) References Cited

U.S. PATENT DOCUMENTS

| | | | | | |
|---|---|---|---|---|---|
| 4,790,192 | A | * | 12/1988 | Knecht | G01L 9/0054 338/4 |
| 4,879,627 | A | * | 11/1989 | Grantham | G01L 9/0073 361/283.3 |
| 5,146,787 | A | * | 9/1992 | Thomas | G01L 9/0019 73/704 |
| 7,992,443 | B2 | * | 8/2011 | Opitz | G01L 9/0072 73/718 |

FOREIGN PATENT DOCUMENTS

JP 2015-512046 A 4/2015

* cited by examiner

*Primary Examiner* — Peter J Macchiarolo
*Assistant Examiner* — Jermaine L Jenkins
(74) *Attorney, Agent, or Firm* — Oblon, McClelland, Maier & Neustadt, L.L.P.

(57) ABSTRACT

A sensor chip of a sensor element includes a diaphragm for measuring a differential pressure between a first pressure and a second pressure, a diaphragm for measuring an absolute pressure or a gauge pressure of the second pressure, a first pressure introduction path that transmits the first pressure to the diaphragm for measuring a differential pressure, and a second pressure introduction path that transmits the second pressure to the diaphragms. When the transmission of the first pressure or the second pressure to the diaphragms is indicated by an equivalent circuit, a path for transmitting the first pressure and a path for transmitting the second pressure are symmetrically formed.

5 Claims, 9 Drawing Sheets

PRESSURE SENSOR ELEMENT FOR MEASURING DIFFERENTIAL PRESSURE AND A DIAPHRAGM BASE HAVING A SET OF DIAPHRAGMS DISPLACED BY RECEIVING PRESSURES WHERE A SET OF PRESSURE INLET PASSAGES RESPECTIVELY TRANSMIT DIFFERENT PRESSURES TO THE SET OF DIAPHRAGMS

CROSS-REFERENCE TO RELATED APPLICATIONS

The present application is based on and claims priority to Japanese Application No. 2019-185769, filed Oct. 9, 2019, the entire contents of which are incorporated herein by reference.

BACKGROUND

1. Field of the Disclosure

The present disclosure relates to a sensor element.

2. Description of the Related Art

Hitherto, as a pressure sensor that detects differential pressure or pressure, a semiconductor piezoresistive pressure sensor in which a semiconductor diaphragm, which is a pressure-sensitive portion, is provided with piezoresistance is known (refer to Japanese Unexamined Patent Application Publication (Translation of PCT Application) No. 2015-512046).

The pressure sensor disclosed in Japanese Unexamined Patent Application Publication (Translation of PCT Application) No. 2015-512046 measures only differential pressure or only absolute pressure, and thus structures for measuring a plurality of pressures, such as differential pressure and absolute pressure, are not known.

SUMMARY

Accordingly, the present disclosure has been made to solve the problem above, and an object of the present disclosure is to provide a small sensor element that is capable of measuring a plurality of pressures at the same time with high precision.

A sensor element of the present disclosure includes a sensor chip and a diaphragm base that is joined to one surface of the sensor chip. The sensor chip includes a first diaphragm for measuring a differential pressure between a first pressure and a second pressure, a second diaphragm for measuring an absolute pressure or a gauge pressure of the second pressure, a first pressure introduction path that transmits the first pressure to the first diaphragm, and a second pressure introduction path that transmits the second pressure to the first diaphragm and the second diaphragm. The diaphragm base includes a third diaphragm that directly receives a fluid that is to be measured and that has the first pressure, a fourth diaphragm that directly receives a fluid that is to be measured and that has the second pressure, a third pressure introduction path that communicates with the first pressure introduction path to transmit the first pressure applied to the third diaphragm to the first pressure introduction path and the first diaphragm, and a fourth pressure introduction path that communicates with the second pressure introduction path to transmit the second pressure applied to the fourth diaphragm to the second pressure introduction path and the second diaphragm. A first pressure transmission medium that is capable of transmitting the first pressure to the first diaphragm is sealed in from the first pressure introduction path to the third pressure introduction path, and a second pressure transmission medium that is capable of transmitting the second pressure to the first diaphragm and the second diaphragm is sealed in from the second pressure introduction path to the fourth pressure introduction path. When a movement amount of the first pressure transmission medium and a movement amount of the second pressure transmission medium are modeled by using an electrical charge, a flow speed of the first pressure transmission medium and a flow speed of the second pressure transmission medium are modeled by using an electrical current, the first pressure and the second pressure are modeled by using a voltage, compliances of the first diaphragm to the fourth diaphragm are modeled by using a capacitance, flow path resistances of the first pressure introduction path to the fourth pressure introduction path are modeled by using an electrical resistance, and when the transmission of the first pressure or the second pressure to the first diaphragm and the second diaphragm is indicated by an equivalent circuit, a path for transmitting the first pressure and a path for transmitting the second pressure are symmetrically formed.

In one example of a structure of the sensor element of the present disclosure, the sensor element further includes a reference chamber that is disposed at a second principal surface on a side opposite to a first principal surface of the second diaphragm for measuring the absolute pressure or for measuring the gauge pressure, the second pressure being transmitted to the second diaphragm; and a fifth diaphragm that is disposed so as to face the second diaphragm for measuring the absolute pressure or for measuring the gauge pressure with the reference chamber being interposed between the second diaphragm and the fifth diaphragm. The first pressure introduction path transmits the first pressure to a second principal surface of the fifth diaphragm on a side opposite to a first principal surface of the fifth diaphragm facing the reference chamber. When the transmission of the first pressure or the second pressure to the first diaphragm, the second diaphragm, and the fifth diaphragm is indicated by the equivalent circuit, a path for transmitting the first pressure and a path for transmitting the second pressure are symmetrically formed.

In one example of a structure of the sensor element of the present disclosure, the sensor element further includes a first reference chamber that is disposed at a second principal surface on a side opposite to a first principal surface of the second diaphragm for measuring the absolute pressure or for measuring the gauge pressure, the second pressure being transmitted to the second diaphragm; a sixth diaphragm that is disposed so as to face the first diaphragm for measuring the differential pressure with the first pressure introduction path that transmits the first pressure to the first diaphragm for measuring the differential pressure being interposed between the first diaphragm for measuring the differential pressure and the sixth diaphragm; and a second reference chamber that is disposed at a second principal surface of the sixth diaphragm on a side opposite to a first principal surface of the sixth diaphragm facing the first pressure introduction path. When the transmission of the first pressure or the second pressure to the first diaphragm, the second diaphragm, and the sixth diaphragm is indicated by the equivalent circuit, a path for transmitting the first pressure and a path for transmitting the second pressure are symmetrically formed.

In one example of a structure of the sensor element of the present disclosure, an amount of the first pressure transmission medium with which the first pressure introduction path is filled and an amount of the second pressure transmission medium with which the second pressure introduction path is filled are the same.

In one example of a structure of the sensor element of the present disclosure, the sensor element further includes a liquid amount adjustment chamber that is provided in the first pressure introduction path so that the amount of the first pressure transmission medium and the amount of the second pressure transmission medium are the same.

The present disclosure makes it possible to measure a plurality of pressures at the same time with high precision and to reduce the size of a sensor element.

DETAILED DESCRIPTION

Principle of Disclosure

Figure 1:
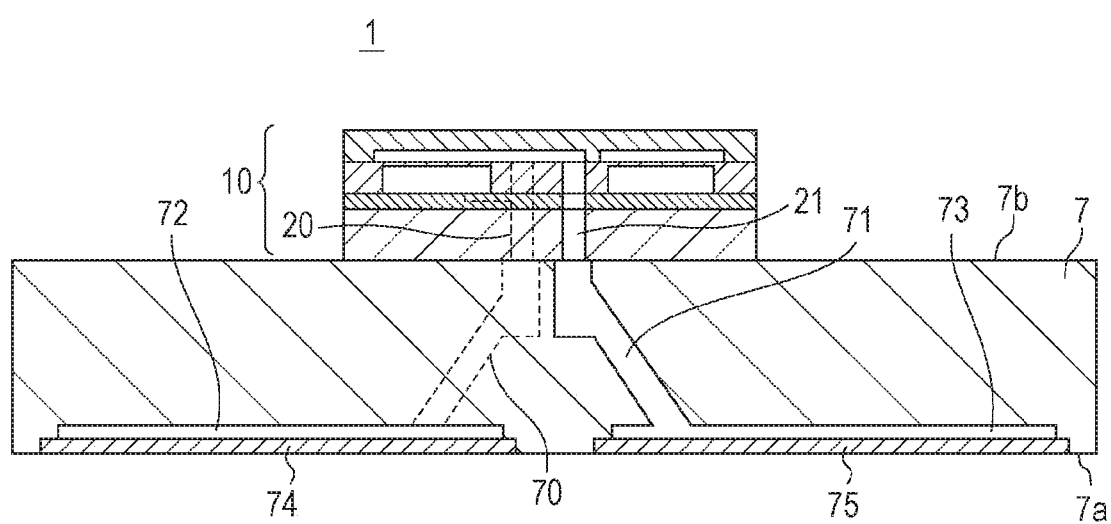
FIG. 1 is a sectional view of a sensor element, which illustrates the principle of the present disclosure.
Figure 2:
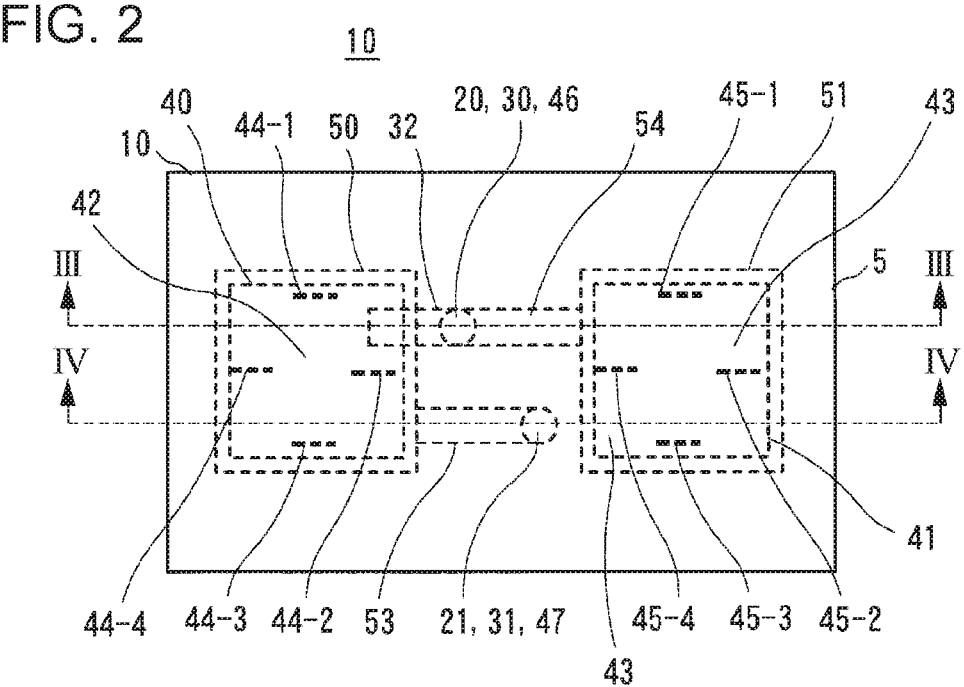
FIG. 2 is a plan view of a sensor chip of the sensor element in FIG. 1.
Figure 3:
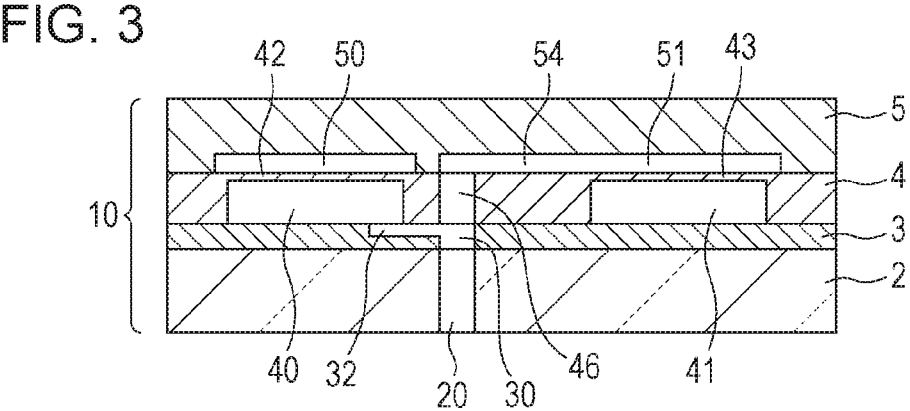
FIG. 3 is a sectional view of the sensor chip of the sensor element in FIG. 1.
Figure 4:
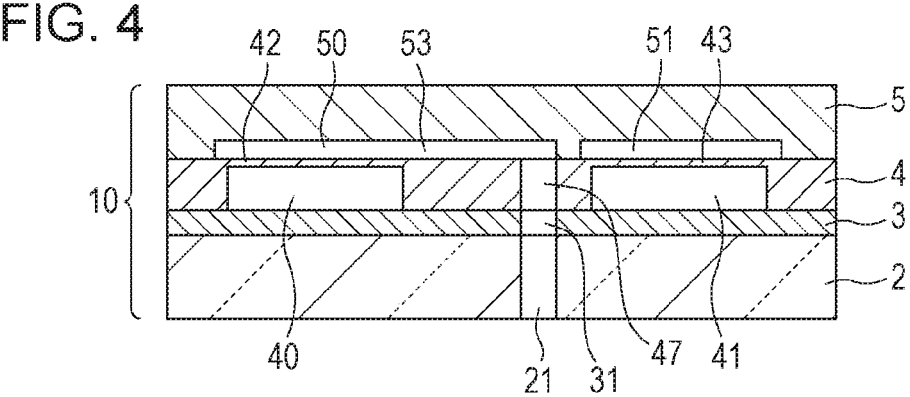
FIG. 4 is a sectional view of the sensor chip of the sensor element in FIG. 1.

FIG. 1 is a sectional view of a sensor element, which illustrates the principle of the present disclosure. FIG. 2 is a plan view of a sensor chip of the sensor element in FIG. 1. FIG. 3 is a sectional view along line III-III in FIG. 2. FIG. 4 is a sectional view along line IV-IV in FIG. 2. A sensor element 1 includes a diaphragm base 7 and a sensor chip 10 mounted on the diaphragm base 7.

The sensor chip 10 includes a flat base plate 2 that is made of glass, a flat flow path member 3 that is joined to the base plate 2 and that is made of silicon, a flat pressure sensitive member 4 that is joined to the flow path member 3 and that is made of silicon, and a flat cover member 5 that is joined to the pressure sensitive member 4 and that is made of silicon.

The base plate 2 has two through holes 20 and 21 that are pressure introduction paths that extend through the base plate 2 from a back surface to a front surface of the base plate 2.

The flow path member 3 has through holes 30 and 31 at locations at which the through holes 30 and 31 communicate with the through holes 20 and 21 when the base plate 2 and the flow path member 3 are joined to each other. The through holes 30 and 31 are pressure introduction paths that extend through the flow path member 3 from a back surface to a front surface of the flow path member 3. A groove 32 is formed in the front surface of the flow path member 3 that faces the pressure sensitive member 4. The groove 32 is a pressure introduction path, one end of which communicates with the through hole 30 and the other end of which communicates with a depression 40 (described later) when the flow path member 3 and the pressure sensitive member 4 are joined to each other.

Two depressions 40 and 41 (pressure introduction chambers) are formed in a back surface of the pressure sensitive member 4 that faces the flow path member 3. The depressions 40 and 41 have a square shape and are formed by removing a back-surface side of the pressure sensitive member 4 so that a front-surface side of the pressure sensitive member 4 remains. Portions remaining at a front-surface side of a region at which the depressions 40 and 41 of the pressure sensitive member 4 are formed are diaphragms 42 and 43.

Strain gauges 44-1 to 44-4 and 45-1 to 45-4 that function as piezoresistive elements due to, for example, impurity diffusion or an ion implantation technology are formed in peripheral edges of the corresponding diaphragms 42 and 43 at a surface of the pressure sensitive member 4 that faces the cover member 5, the diaphragms 42 and 43 being formed on the front-surface side of the region at which the depressions 40 and 41 are formed. The strain gauges 44-1 to 44-4 are formed near center points of four sides of the diaphragm 42 (first diaphragm) having a square shape in plan view. Similarly, the strain gauges 45-1 to 45-4 are formed near center points of four sides of the diaphragm 43 (second diaphragm) having a square shape in plan view.

Further, the pressure sensitive member 4 has through holes 46 and 47 at locations at which the through holes 46 and 47 communicate with the through holes 30 and 31 when the flow path member 3 and the pressure sensitive member 4 are joined to each other. The through holes 46 and 47 are pressure introduction paths that extend through the pressure sensitive member 4 from the back surface to the front surface of the pressure sensitive member 4.

Two depressions 50 and 51 (pressure introduction chambers) are formed in a back surface of the cover member 5 that faces the pressure sensitive member 4 at locations at which the depressions 50 and 51 are placed over the diaphragms 42 and 43 when the pressure sensitive member 4 and the cover member 5 are joined to each other. The depressions 50 and 51 have a square shape and are formed by removing a back-surface side of the cover member 5 so that a front-surface side of the cover member 5 remains. A groove 53 is formed in the back surface of the cover member 5. The groove 53 is a pressure introduction path, one end of which communicates with the through hole 47 and the other end of which communicates with the depression 50 when the pressure sensitive member 4 and the cover member 5 are joined to each other. Further, a groove 54 is formed in the back surface of the cover member 5. The groove 54 is a pressure introduction path, one end of which communicates with the through hole 46 and the other end of which communicates with the depression 51 when the pressure sensitive member 4 and the cover member 5 are joined to each other.

It goes without saying that the through holes 20, 21, 30, 31, 46, and 47, the depressions 40, 41, 50, and 51, and the grooves 32, 53, and 54 can be easily formed by an etching technology. Through holes, depressions, and grooves of subsequent embodiments can be similarly easily formed by the etching technology.

The base plate 2 and the flow path member 3 are directly joined to each other so that the through holes 20 and 21 of the base plate 2 communicate with the through holes 30 and 31 of the flow path member 3. The flow path member 3 and the pressure sensitive member 4 are directly joined to each other so that the through holes 30 and 31 of the flow path member 3 communicate with the through holes 46 and 47 of the pressure sensitive member 4 and so that the groove 32 of the flow path member 3 and the depression 40 of the pressure sensitive member 4 communicate with each other. The pressure sensitive member 4 and the cover member 5 are directly joined to each other so that the depressions 50 and 51 of the cover member 5 are placed over the diaphragms 42 and 43 of the pressure sensitive member 4, the through hole 46 of the pressure sensitive member 4 and the groove 54 of the cover member 5 communicate with each other, and the through hole 47 of the pressure sensitive member 4 and the groove 53 of the cover member 5 communicate with each other.

The diaphragm base 7 is made of a metal material for guiding the pressure of a fluid to be measured to the sensor chip 10. An example of the metal material can be stainless steel (SUS). As shown in FIG. 1, the diaphragm base 7 has a principal surface 7a and a principal surface 7b on a side opposite to the principal surface 7a. The diaphragm base 7 has through holes 70 and 71 that are pressure introduction paths that extend through the principal surface 7a and the principal surface 7b. Two depressions 72 and 73 are each formed at an opening portion on a principal-surface-7a side of a corresponding one of the through holes 70 and 71. The depression 72 is covered by a barrier diaphragm 74 (a fourth diaphragm) that directly receives a fluid that is to be measured and that has a second pressure. Similarly, the depression 73 is covered by a barrier diaphragm 75 (a third diaphragm) that directly receives a fluid that is to be measured and that has a first pressure. The barrier diaphragms 74 and 75 are made of, for example, stainless steel (SUS).

The sensor chip 10 and the diaphragm base 7 are joined to each other with an adhesive so that the through holes 20 and 21 of the sensor chip 10 communicate with the through holes 70 and 71 of the diaphragm base 7.

A first oil (a first pressure transmission medium) is capable of reaching an upper surface of the diaphragm 42 of the sensor chip 10 via the depression 73 and the through hole 71 of the diaphragm base 7 and the through holes 21, 31, 47, and 52, the groove 53, and the depression 50 of the sensor chip 10. The first oil transmits the first pressure applied to the barrier diaphragm 75 to the upper surface of the diaphragm 42. A second oil (a second pressure transmission medium) is capable of reaching a lower surface of the diaphragm 42 via the depression 72 and the through hole 70 of the diaphragm base 7 and the through holes 20 and 30, the groove 32, and the depression 40 of the sensor chip 10. The second oil transmits the second pressure applied to the barrier diaphragm 74 to the lower surface of the diaphragm 42.

The second oil is capable of reaching an upper surface of the diaphragm 43 of the sensor chip 10 via the depression 72 and the through hole 70 of the diaphragm base 7 and the through holes 20, 30, and 46, the groove 54, and the depression 51 of the sensor chip 10. The second oil transmits the second pressure applied to the barrier diaphragm 74 to the upper surface of the diaphragm 43. The depression 41 (reference chamber) at the lower surface of the diaphragm 43 is hermetically sealed in a vacuous state.

Although not shown in FIGS. 1 to 4, when, for example, the planar shape of the pressure sensitive member 4 is made larger than the planar shape of the cover member 5, and the strain gauges 44-1 to 44-4 and 45-1 to 45-4 and eight electrode pads that are electrically connected to a corresponding one of the strain gauges 44-1 to 44-4 and 45-1 to 45-4 are formed on an exposed surface of the pressure sensitive member 4, it is possible to connect the strain gauges 44-1 to 44-4 and 45-1 to 45-4 to an external circuit. The method of connecting the strain gauges to the external circuit are the same for the subsequent embodiments.

The strain gauges 44-1 to 44-4 constitute together with the external circuit a Wheatstone bridge circuit for measuring differential pressure. The Wheatstone bridge circuit for measuring differential pressure is capable of measuring the difference between the first pressure that is applied to the upper surface of the diaphragm 42 and the second pressure that is applied to the lower surface of the diaphragm 42.

The strain gauges 45-1 to 45-4 constitute together with the external circuit a Wheatstone bridge circuit for measuring absolute pressure. The Wheatstone bridge circuit for measuring absolute pressure is capable of measuring the absolute pressure of the second pressure that is applied to the upper surface of the diaphragm 43.

Since the structure of the Wheatstone bridge circuit is based on a known technology, the structure of the Wheatstone bridge circuit is not described in detail.

Figure 5:
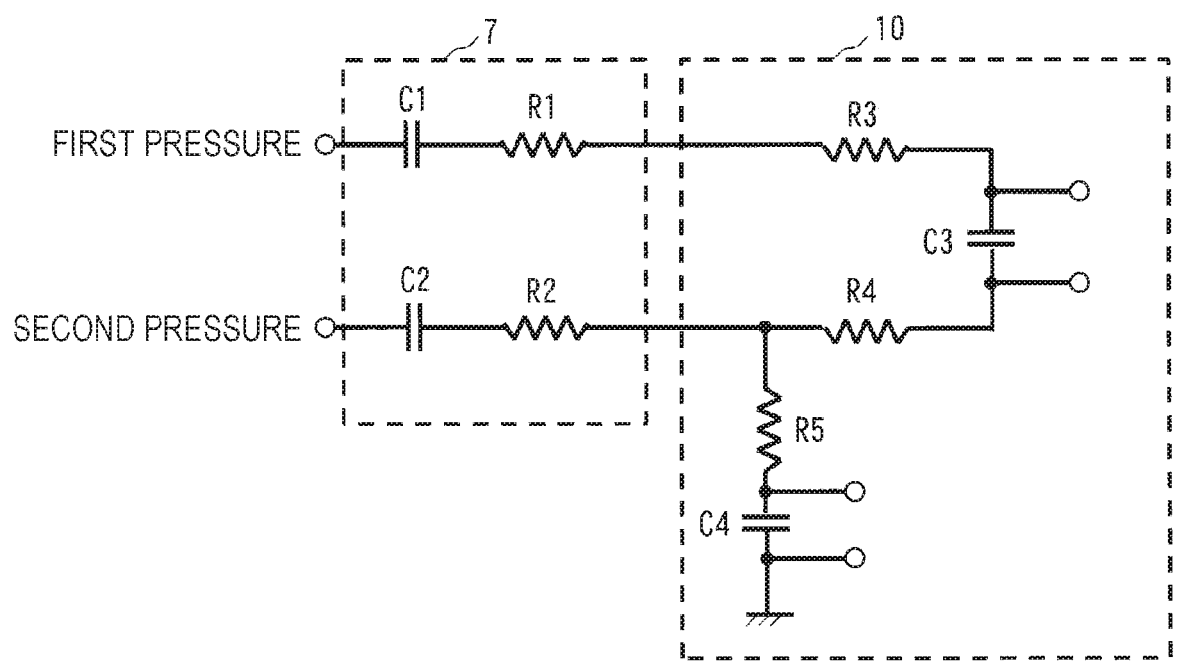
FIG. 5 is an equivalent circuit diagram of the sensor element in FIG. 1.

An equivalent circuit of the sensor element 1 described above is shown in FIG. 5. In FIG. 5, a capacitor C1 is obtained by modeling a compliance of the barrier diaphragm 75, a capacitor C2 is obtained by modeling a compliance of the barrier diaphragm 74, a capacitor C3 is obtained by modeling a compliance of the diaphragm 42, and a capacitor C4 is obtained by modeling a compliance of the diaphragm 43.

A resistor R1 is a flow path resistance of the depression 73 and the through hole 71, in which the first oil is sealed. A resistor R2 is a flow path resistance of the depression 72 and the through hole 70, in which the second oil is sealed. A resistor R3 is a flow path resistance of the through holes 21, 31, and 47, the groove 53, and the depression 50, in which the first oil is sealed. A resistor R4 is a flow path resistance of the through holes 20 and 30, the groove 32, and the depression 40, in which the second oil is sealed. A resistor R5 is a flow path resistance of the through holes 20, 30 and 46, the groove 54, and the depression 51, in which the second oil is sealed.

In the equivalent circuit in FIG. 5, an oil movement amount is modeled by using an electrical charge, an oil flow speed is modeled by using an electrical current, and a pressure is modeled by using a voltage. A differential pressure between the first pressure and the second pressure is obtained as a voltage between both ends of the capacitor C3, and an absolute pressure of the second pressure is obtained as a voltage between both ends of the capacitor C4. Note that, in the equivalent circuit in FIG. 5, the compressibility of the oil is ignored.

FIG. 5 illustrates that, in the sensor element 1 in FIG. 1, since a path for transmitting the first pressure and a path for transmitting the second pressure are asymmetrically formed, problems such as problems (A) and (B) below occur. The smaller the aspect ratio (the ratio of diameter to film thickness) of the diaphragms 74 and 75, that is, the smaller the compliance, due to a size reduction of a device, and the larger the aspect ratio of the diaphragms 42 and 43, that is, the larger the compliance, due to an increase in the sensitivity of the sensor, the larger the effects of the problems (A) and (B):

(A) Occurrence of an excessive differential pressure when static pressure is applied; and (B) Shift in a zero point when static pressure is applied.

The problems (A) and (B) are described by using the equivalent circuit in FIG. 5. When a static pressure is applied to the sensor element 1, in the equivalent circuit in FIG. 5, the same voltage is applied at the same time to a side of the capacitor C1 (hereunder referred to as a primary side) and to a side of the capacitor C2 (hereunder referred to as a secondary side). When an absolute sensor (the capacitor C4 and the resistor R5) does not exist, since the path for transmitting the first pressure and the path for transmitting the second pressure are symmetrically formed, even if the same voltage is applied to the primary side and the secondary side at the same time, an electrical charge does not accumulate in the capacitor C3, as a result of which a voltage does not occur between both ends of the capacitor C3. That is, an excessive differential pressure does not occur when a static pressure is applied.

However, in the equivalent circuit in FIG. 5, when an absolute pressure sensor exists, an electrical charge accumulates in the capacitor C4. On the primary side, a voltage is applied to the capacitor C3 without delay, whereas, on the secondary side, an increase in voltage in the capacitor C3 is delayed. That is, a differential pressure occurs temporarily.

Since an electrical charge flows to the capacitor C4 on the secondary side and an electrical charge also accumulates in the capacitor C2 on the same secondary side, a voltage occurs in the capacitor C2. On the first primary side, the applied voltage (the first pressure) is applied as it is to the capacitor C3, whereas, on the secondary side, a voltage obtained by subtracting the voltage occurring in the capacitor C2 from the applied voltage (the second pressure) is applied to the capacitor C3. Therefore, a zero point based on the static pressure is shifted.

Next, the problems (A) and (B) are qualitatively described. When a static pressure is applied to the sensor element 1, if an absolute pressure sensor does not exist, the primary side and the secondary side are symmetrically provided. Therefore, on both the primary side and the secondary side, the barrier diaphragms 74 and 75 are displaced by only the same compressed amount of the sealed-in oil. In this case, since a differential pressure does not occur between the primary side and the secondary side, the diaphragm 42 for measuring a differential pressure is not displaced.

However, in the sensor element 1 in FIG. 1, since an absolute pressure sensor exists, the diaphragm 43 is displaced. By an amount corresponding to the time required for the displacement, the transmission of pressure to the diaphragm 42 is delayed on the secondary side. Therefore, a differential pressure occurs temporarily. When the diaphragm 43 is displaced, the barrier diaphragm 74 on the secondary side is displaced by an amount that is larger than the amount of displacement of the barrier diaphragm 75 on the primary side in correspondence with the displacement amount of the diaphragm 43. Opposing forces of the barrier diaphragms 74 and 75 increase in accordance with their displacement amounts. Since a difference between the opposing forces also occurs due to a difference between the displacements of the barrier diaphragms 74 and 75, an internal pressure difference occurs by an amount corresponding to the difference between the opposing forces.

Although, in the description above, the effects of the absolute pressure sensor on a differential pressure sensor are described, the differential pressure also affects the absolute pressure sensor.

As described above, in the sensor element 1 in FIG. 1, since the path for transmitting the first pressure and the path for transmitting the second pressure are asymmetrically formed, the problems (A) and (B) occur. In the present disclosure, when the path for transmitting the first pressure and the path for transmitting the second pressure are symmetrically formed as described below, the problems (A) and (B) are overcome.

First Embodiment

Figure 6:
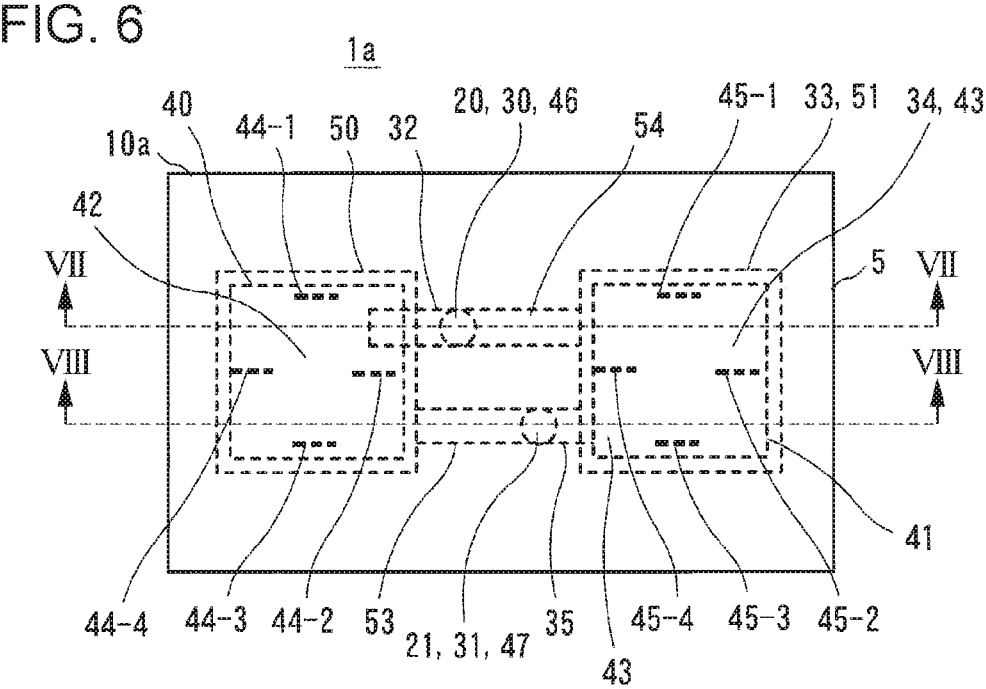
FIG. 6 is a plan view of a sensor chip of a sensor element according to a first embodiment of the present disclosure.
Figure 7:
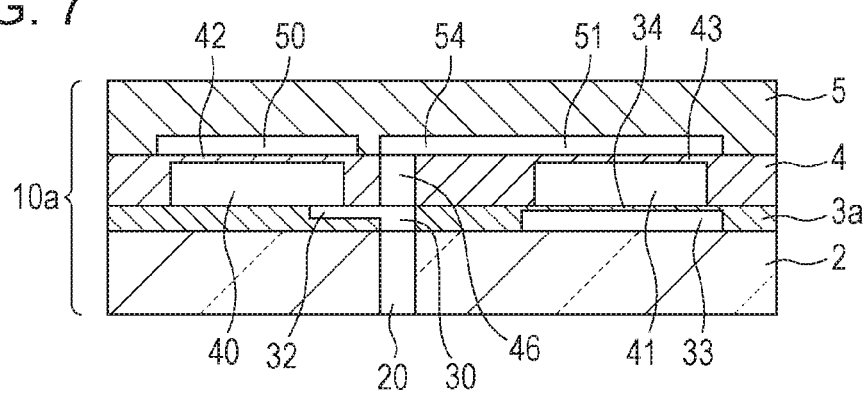
FIG. 7 is a sectional view of the sensor chip of the sensor element according to the first embodiment of the present disclosure.
Figure 8:
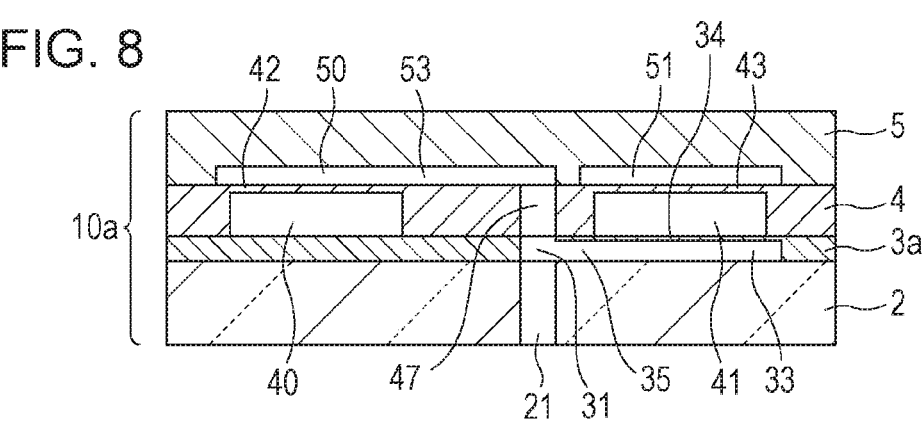
FIG. 8 is a sectional view of the sensor chip of the sensor element according to the first embodiment of the present disclosure.

An embodiment of the present disclosure is described below with reference to the drawings. FIG. 6 is a plan view of a sensor element according to a first embodiment of the present disclosure. FIG. 7 is a sectional view along line VII-VII in FIG. 6. FIG. 8 is a sectional view along line VIII-VIII in FIG. 6. A sensor element 1a of the present embodiment includes a diaphragm base and a sensor chip 10a mounted on the diaphragm base. Since the diaphragm base is as described with reference to FIG. 1, the diaphragm base is not described, and the same reference signs as those in FIG. 1 are used in the following description.

The sensor chip 10a includes a flat base plate 2 that is made of glass, a flat flow path member 3a that is joined to the base plate 2 and that is made of silicon, a flat pressure sensitive member 4 that is joined to the flow path member 3a and that is made of silicon, and a flat cover member 5 that is joined to the pressure sensitive member 4 and that is made of silicon. The base plate 2, the pressure sensitive member 4, and the cover member 5 are as described with reference to FIGS. 1 to 4.

The flow path member 3a has through holes 30 and 31 at locations at which the through holes 30 and 31 communicate with through holes 20 and 21 when the base plate 2 and the flow path member 3a are joined to each other. The through holes 30 and 31 are pressure introduction paths that extend through the flow path member 3a from a back surface to a front surface of the flow path member 3a. A depression 33 (a pressure introduction chamber) is formed in a back surface of the flow path member 3a that faces the base plate 2. The depression 33 has a square shape and is formed by removing a back-surface side of the flow path member 3a so that a front-surface side of the flow path member 3a remains. A portion remaining at a front-surface side of a region at which the depression 33 of the flow path member 3a is formed is a dummy diaphragm 34 (a fifth diaphragm) having a compliance that is the same as that of a diaphragm 43.

A groove 35 is formed in the back surface of the flow path member 3a and is a pressure introduction path, one end of which communicates with the through hole 31 and the other end of which communicates with the depression 33. Further, a groove 32 is formed in a front surface of the flow path member 3a that faces the pressure sensitive member 4. The groove 32 is a pressure introduction path, one end of which communicates with the through hole 30 and the other end of which communicates with the depression 40 of the pressure sensitive member 4 when the flow path member 3a and the pressure sensitive member 4 are joined to each other.

The through holes 21, 31, and 47, the groove 53, and the depression 50 constitute a first pressure introduction path for transmitting a first pressure to a first principal surface (an upper surface) of the diaphragm 42. The through holes 20, 30, and 46, the grooves 32 and 54, and the depressions 40 and 51 constitute a second pressure introduction path for transmitting a second pressure to a second principal surface (a lower surface) of the diaphragm 42 and a first principal surface (an upper surface) of the diaphragm 43.

The base plate 2 and the flow path member 3a are directly joined to each other so that the through holes 20 and 21 of the base plate 2 communicate with the through holes 30 and 31 of the flow path member 3a. The flow path member 3a and the pressure sensitive member 4 are directly joined to each other so that the depression 41 of the pressure sensitive member 4 is placed over the dummy diaphragm 34 of the flow path member 3a, the through holes 30 and 31 of the flow path member 3a communicate with the through holes 46 and 47 of the pressure sensitive member 4, and the groove 32 of the flow path member 3a and the depression 40 of the pressure sensitive member 4 communicate with each other. The pressure sensitive member 4 and the cover member 5 are directly joined to each other so that the depressions 50 and 51 of the cover member 5 are placed over the diaphragms 42 and 43 of the pressure sensitive member 4, the through hole 46 of the pressure sensitive member 4 and the groove 54 of the cover member 5 communicate with each other, and the through hole 47 of the pressure sensitive member 4 and the groove 53 of the cover member 5 communicate with each other.

As in FIG. 1, the sensor chip 10a and the diaphragm base 7 are joined to each other with an adhesive so that the through holes 20 and 21 of the sensor chip 10a communicate with the through holes 70 and 71 of the diaphragm base 7.

The depression 73 and the through hole 71 of the diaphragm base 7 constitute a third pressure introduction path that communicates with the first pressure introduction path to transmit the first pressure applied to the diaphragm 75 to the first pressure introduction path and the diaphragm 42. The depression 72 and the through hole 70 of the diaphragm base 7 constitute a fourth pressure introduction path that communicates with the second pressure introduction path to transmit the second pressure applied to the diaphragm 74 to the second pressure introduction path and the diaphragm 43.

Figure 9:
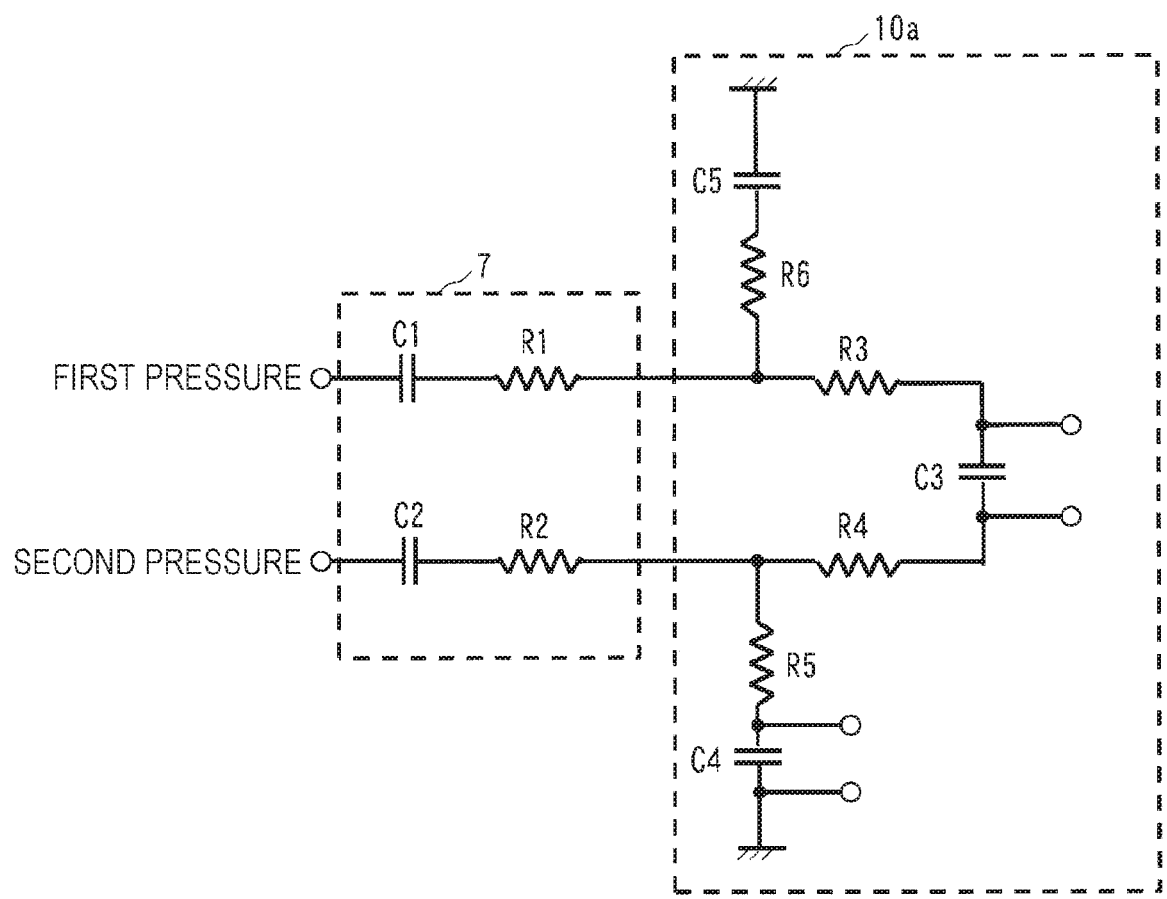
FIG. 9 is an equivalent circuit diagram of the sensor element according to the first embodiment of the present disclosure.

An equivalent circuit of the sensor element 1a of the present embodiment is shown in FIG. 9. In FIG. 9, a capacitor C1 is obtained by modeling a compliance of the barrier diaphragm 75, a capacitor C2 is obtained by modeling a compliance of the barrier diaphragm 74, a capacitor C3 is obtained by modeling a compliance of the diaphragm 42, a capacitor C4 is obtained by modeling a compliance of the diaphragm 43, and a capacitor C5 is obtained by modeling a compliance of the dummy diaphragm 34.

A resistor R1 is a flow path resistance of the depression 73 and the through hole 71, in which the first oil is sealed. A resistor R2 is a flow path resistance of the depression 72 and the through hole 70, in which the second oil is sealed. A resistor R3 is a flow path resistance of the through holes 21, 31, and 47, the groove 53, and the depression 50, in which the first oil is sealed. A resistor R4 is a flow path resistance of the through holes 20 and 30, the groove 32, and the depression 40, in which the second oil is sealed. A resistor R5 is a flow path resistance of the through holes 20, 30 and 46, the groove 54, and the depression 51, in which the second oil is sealed. A resistor R6 is a flow path resistance of the through holes 21 and 31, the groove 35, and the depression 33, in which the first oil is sealed.

As in FIG. 5, in the equivalent circuit in FIG. 9, an oil movement amount is modeled by using an electrical charge, an oil flow speed is modeled by using an electrical current, and a pressure is modeled by using a voltage. Note that, in the equivalent circuit in FIG. 9, the compressibility of the oil is ignored.

As illustrated in FIG. 9, in the sensor element 1a of the present embodiment, since the groove 35, the depression 33, and the dummy diaphragm 34 are provided, the path for transmitting the first pressure and the path for transmitting the second pressure are symmetrically formed. Therefore, in the present embodiment, it is possible to measure differential pressure and absolute pressure at the same time with high sensitivity and to reduce the size of the sensor element, while suppressing the problems (A) and (B) above from occurring.

Note that, in order to cause the path for transmitting the first pressure and the path for transmitting the second pressure to be perfectly symmetrically formed, it is desirable that the value of the capacitor C1 (the compliance of the barrier diaphragm 75) and the value of the capacitor C2 (the compliance of the barrier diaphragm 74) be equal to each other, and the value of the capacitor C4 (the compliance of the diaphragm 43) and the value of the capacitor C5 (the compliance of the dummy diaphragm 34) be equal to each other. In addition, it is desirable that the value of the resistor R1 (the flow path resistance of the depression 73 and the through hole 71) and the value of the resistor R2 (the flow path resistance of the depression 72 and the through hole 70) be equal to each other, the value of the resistor R3 (the flow path resistance of the through holes 21, 31, and 47, the groove 53, and the depression 50) and the value of the resistor R4 (the flow path resistance of the through holes 20 and 30, the groove 32, and the depression 40) be equal to each other, and the value of the resistor R5 (the flow path resistance of the through holes 20, 30, and 46, the groove 54, and the depression 51) and the value of the resistor R6 (the flow path resistance of the through holes 21 and 31, the groove 35, and the depression 33) be equal to each other.

In the present embodiment, under the assumption that the path for transmitting the first pressure and the path for transmitting the second pressure are symmetrically formed, it is desirable that the amount of first oil that is sealed in the depression 73 and the through hole 71 of the diaphragm base 7 and the through holes 21, 31, and 47, the grooves 35 and 53, and the depressions 33 and 50 of the sensor chip 10a be the same as the amount of second oil that is sealed in the depression 72 and the through hole 70 of the diaphragm base 7 and the through holes 20, 30, and 46, the grooves 32 and 54, and the depressions 40 and 51 of the sensor chip 10a.

In the structures shown in FIGS. 1 to 4, since the first oil is not introduced into the depression 41 at the lower surface of the diaphragm 43, the amount of first oil is less than the amount of second oil. When there is such a difference between the oil amounts in this way, the problem that the zero point of pressure is shifted by a large amount due to temperature caused by the difference between the oil amounts occurs.

In the present embodiment, since the first oil is introduced into the groove 35 and the depression 33, the amount of first oil and the amount of second oil can be made the same, or the difference between the amount of first oil and the amount of second oil can be made small, as a result of which it is possible to reduce changes in characteristics caused by the expansion/the contraction of the oil resulting from changes in temperature (shift in the zero point of differential pressure).

Second Embodiment

Figure 10:
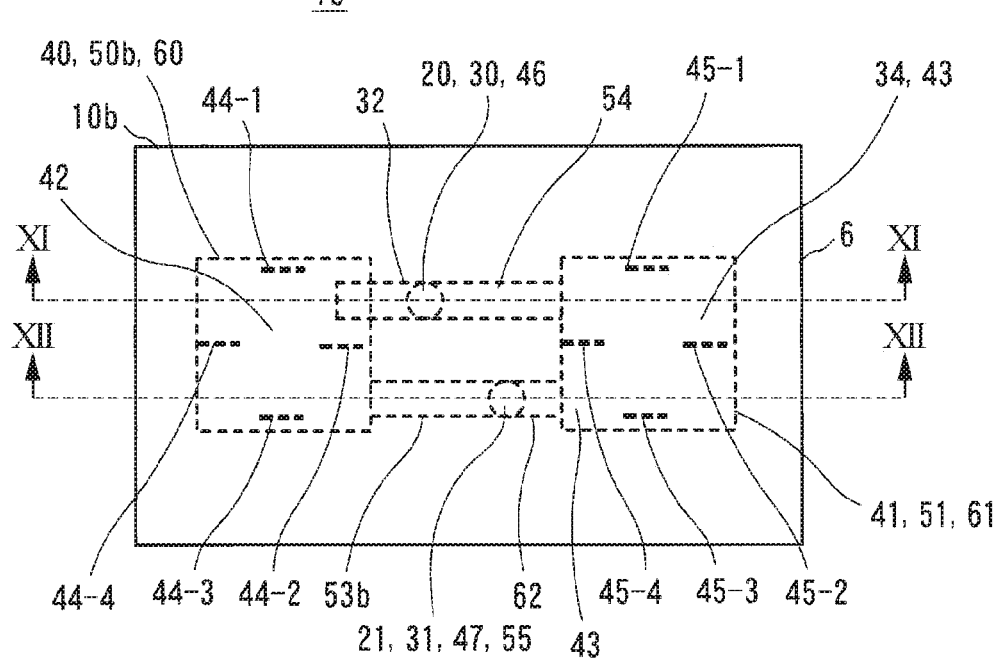
FIG. 10 is a plan view of a sensor chip of a sensor element according to a second embodiment of the present disclosure.
Figure 11:
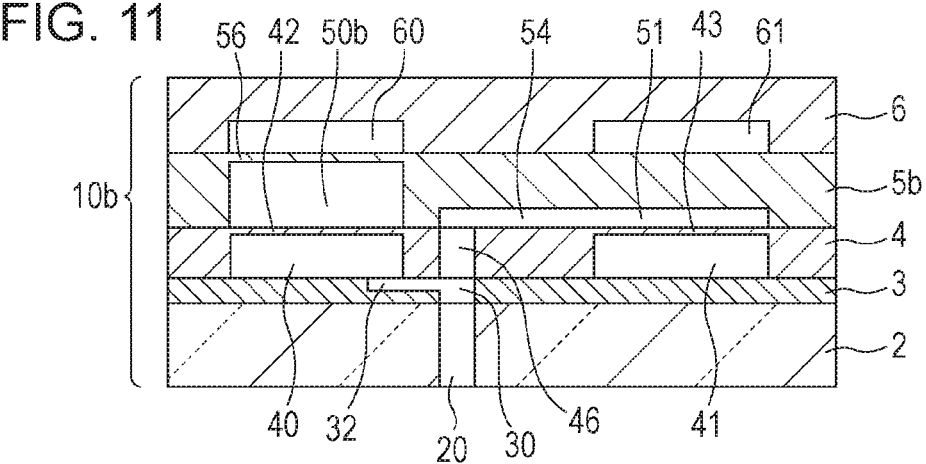
FIG. 11 is a sectional view of the sensor chip of the sensor element according to the second embodiment of the present disclosure.
Figure 12:
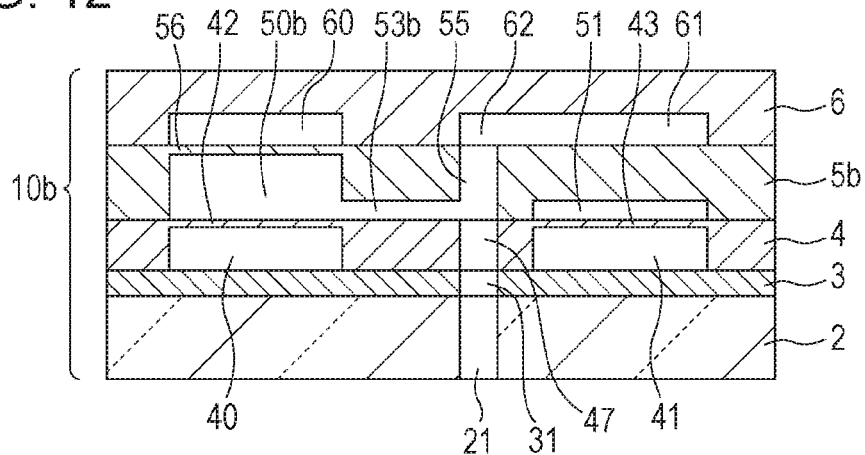
FIG. 12 is a sectional view of the sensor chip of the sensor element according to the second embodiment of the present disclosure.

Next, a second embodiment of the present disclosure is described. FIG. 10 is a plan view of a sensor element according to the second embodiment of the present disclosure. FIG. 11 is a sectional view along line XI-XI in FIG. 10. FIG. 12 is a sectional view along line XII-XII in FIG. 10. A sensor element 1b of the present embodiment includes a diaphragm base and a sensor chip 10b mounted on the diaphragm base. Since the diaphragm base is as described with reference to FIG. 1, the diaphragm base is not described, and the same reference signs as those in FIG. 1 are used in the following description.

The sensor chip 10b includes a flat base plate 2 that is made of glass, a flat flow path member 3 that is joined to the base plate 2 and that is made of silicon, a flat pressure sensitive member 4 that is joined to the flow path member 3 and that is made of silicon, a flat cover member 5b that is joined to the pressure sensitive member 4 and that is made of silicon, and a flat symmetrical adjusting member 6 that is joined to the cover member 5b and that is made of silicon. The base plate 2, the flow path member 3, and the pressure sensitive member 4 are as described with reference to FIGS. 1 to 4.

Two depressions 50b and 51 (pressure introduction chambers) are formed in a back surface of the cover member 5b that faces the pressure sensitive member 4 at locations at which the depressions 50b and 51 are placed over diaphragms 42 and 43 when the pressure sensitive member 4 and the cover member 5b are joined to each other. The depressions 50b and 51 have a square shape and are formed by removing a back-surface side of the cover member 5b so that a front-surface side of the cover member 5b remains. A through hole 55 is formed at a location at which the through hole 55 communicates with a through hole 47 when the pressure sensitive member 4 and the cover member 5b are joined to each other. The through hole 55 is a pressure introduction path that extends through the cover member 5b from the back surface to a front surface of the cover member 5b.

A groove 53b is formed in the back surface of the cover member 5b. The groove 53b is a pressure introduction path, one end of which communicates with the through hole 55 and the other end of which communicates with the depression 50b. A groove 54 is formed in the back surface of the cover member 5b. The groove 54 is a pressure introduction path, one end of which communicates with a through hole 46 and the other end of which communicates with the depression 51 when the pressure sensitive member 4 and the cover member 5b are joined to each other. A portion remaining at a front-surface side of a region at which the depression 50b of the cover member 5b is formed is a dummy diaphragm 56 (a sixth diaphragm) having a compliance that is the same as that of the diaphragm 43.

A depression 60 (a second reference chamber) is formed in a back surface of the symmetrical adjusting member 6 that faces the cover member 5b at a location at which the depression 60 is placed over the dummy diaphragm 56 when the cover member 5b and the symmetrical adjusting member 6 are joined to each other. The depression 60 has a square shape and is formed by removing a back-surface side of the symmetrical adjusting member 6 so that a front-surface side of the symmetrical adjusting member 6 remains. A depression 61 (a liquid amount adjustment chamber) is formed in the back surface of the symmetrical adjusting member 6. The depression 61 has a square shape and is formed by removing a back-surface side of the symmetrical adjusting member 6 so that a front-surface side of the symmetrical adjusting member 6 remains. Further, a groove 62 is formed in the back surface of the symmetrical adjusting member 6. The groove 62 is a pressure introduction path, one end of which communicates with the through hole 55 and the other end of which communicates with the depression 61 when the cover member 5b and the symmetrical adjusting member 6 are joined to each other.

The through holes 21, 31, and 47, and 55, the groove 53b, and the depression 50b constitute a first pressure introduction path for transmitting a first pressure to a first principal surface (an upper surface) of the diaphragm 42 and a first principal surface (a lower surface) of the dummy diaphragm 56. The through holes 20, 30, and 46, a groove 32 and the groove 54, and a depression 40 and the depression 51 constitute a second pressure introduction path for transmitting a second pressure to a second principal surface (a lower surface) of the diaphragm 42 and a first principal surface (an upper surface) of the diaphragm 43.

The pressure sensitive member 4 and the cover member 5b are directly joined to each other so that the depressions 50b and 51 of the cover member 5b are placed over the diaphragms 42 and 43 of the pressure sensitive member 4, the through hole 46 of the pressure sensitive member 4 and the groove 54 of the cover member 5b communicate with each other, and the through hole 47 of the pressure sensitive member 4 and the through hole 55 the cover member 5b communicate with each other. The cover member 5b and the symmetrical adjusting member 6 are directly joined to each other so that the depression 60 of the symmetrical adjusting member 6 is placed over the dummy diaphragm 56 of the cover member 5b and so that the through hole 55 of the cover member 5b and the groove 62 of the symmetrical adjusting member 6 communicate with each other. Similarly to the depression 41 (first reference chamber), the depression 60 (the second reference chamber) is hermetically sealed in a vacuous state.

As in FIG. 1, the sensor chip 10b and the diaphragm base 7 are joined to each other with an adhesive so that the through holes 20 and 21 of the sensor chip 10b communicate with the through holes 70 and 71 of the diaphragm base 7.

Even in the present embodiment, an equivalent circuit of the sensor element 1b is as shown in FIG. 9. Capacitors C1 to C4 are the same as those in the first embodiment. A capacitor C5 is obtained by modeling a compliance of the dummy diaphragm 56. Resistors R1, R2, R4, and R5 are the same as those in the first embodiment. R3 and R6 are flow path resistances of the through holes 21, 31, 47, and 55, the groove 53b, and the depression 50b, in which a first oil is sealed.

In the sensor element 1b of the present embodiment, since the groove 53b, the depressions 50b and 60, and the dummy diaphragm 56 are provided, the path for transmitting the first pressure and the path for transmitting the second pressure are symmetrically formed. Therefore, in the present embodiment, it is possible to measure differential pressure and absolute pressure at the same time with high sensitivity and to reduce the size of the sensor element, while suppressing the problems (A) and (B) above from occurring.

As in the first embodiment, in order to cause the path for transmitting the first pressure and the path for transmitting the second pressure to be perfectly symmetrically formed, it is desirable that the value of the capacitor C1 (the compliance of the barrier diaphragm 75) and the value of the capacitor C2 (the compliance of the barrier diaphragm 74) be equal to each other, and the value of the capacitor C4 (the compliance of the diaphragm 43) and the value of the capacitor C5 (the compliance of the dummy diaphragm 56) be equal to each other. In addition, it is desirable that the value of the resistor R1 (the flow path resistance of the depression 73 and the through hole 71) and the value of the resistor R2 (the flow path resistance of the depression 72 and the through hole 70) be equal to each other, the value of the resistor R3 (the flow path resistance of the through holes 21, 31, 47, and 55, the groove 53b, and the depression 50b) and the value of the resistor R4 (the flow path resistance of the through holes 20 and 30, the groove 32, and the depression 40) be equal to each other, and the value of the resistor R5 (the flow path resistance of the through holes 20, 30, and 46, the groove 54, and the depression 51) and the value of the resistor R6 (the flow path resistance of the through holes 21, 31, 47, and 55, the groove 53b, and the depression 50b) be equal to each other.

In the present embodiment, under the assumption that the path for transmitting the first pressure and the path for transmitting the second pressure are symmetrically formed, it is desirable that the amount of first oil that is sealed in the depression 73 and the through hole 71 of the diaphragm base 7 and the through holes 21, 31, and 47, and 55, the grooves 53b and 62, and the depressions 50b and 61 of the sensor chip 10b be the same as the amount of second oil that is sealed in the depression 72 and the through hole 70 of the diaphragm base 7 and the through holes 20, 30, and 46, the grooves 32 and 54, and the depressions 40 and 51 of the sensor chip 10b.

In the present embodiment, since the first oil is introduced into the groove 62 and the depression 61, the amount of first oil and the amount of second oil can be made the same, or the difference between the amount of first oil and the amount of second oil can be made small, as a result of which it is possible to reduce changes in characteristics caused by the expansion/the contraction of the oil resulting from changes in temperature (shift in the zero point of differential pressure).

Third Embodiment

Figure 13:
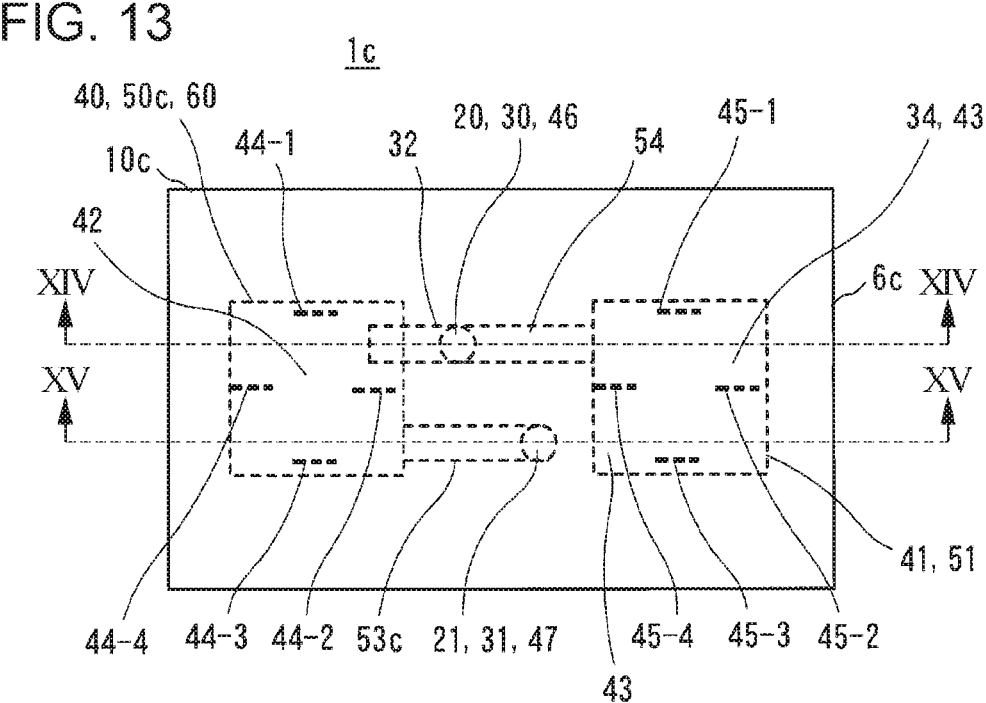
FIG. 13 is a plan view of a sensor chip of a sensor element according to a third embodiment of the present disclosure.
Figure 14:
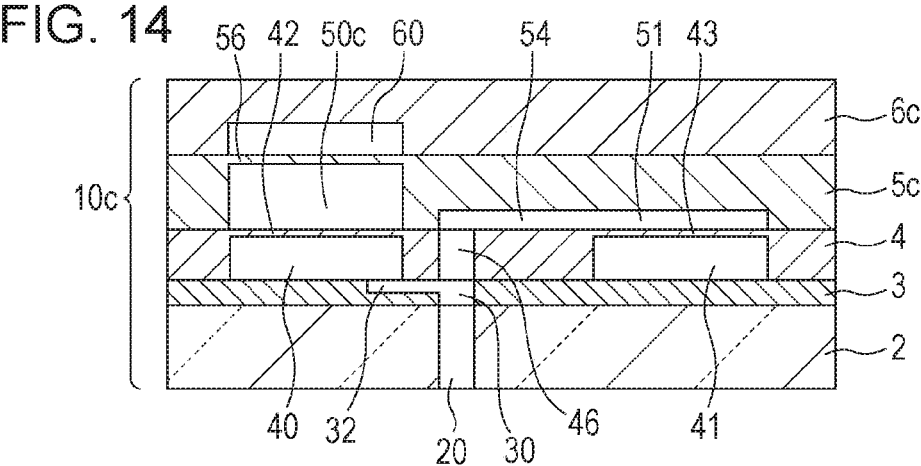
FIG. 14 is a sectional view of the sensor chip of the sensor element according to the third embodiment of the present disclosure.
Figure 15:
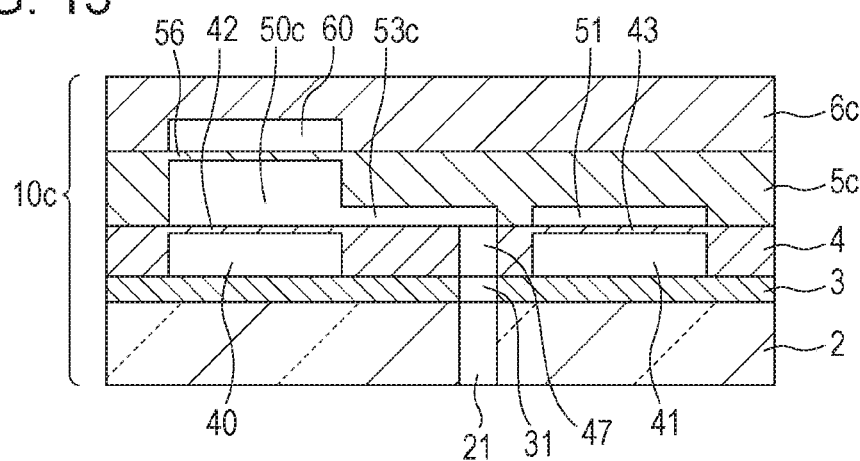
FIG. 15 is a sectional view of the sensor chip of the sensor element according to the third embodiment of the present disclosure.

Next, a third embodiment of the present disclosure is described. FIG. 13 is a plan view of a sensor element according to the third embodiment of the present disclosure. FIG. 14 is a sectional view along line XIV-XIV in FIG. 13. FIG. 15 is a sectional view along line XV-XV in FIG. 13. A sensor element 1c of the present embodiment includes a diaphragm base and a sensor chip 10c mounted on the diaphragm base. Since the diaphragm base is as described with reference to FIG. 1, the diaphragm base is not described, and the same reference signs as those in FIG. 1 are used in the following description.

The sensor chip 10c includes a flat base plate 2 that is made of glass, a flat flow path member 3 that is joined to the base plate 2 and that is made of silicon, a flat pressure sensitive member 4 that is joined to the flow path member 3 and that is made of silicon, a flat cover member 5c that is joined to the pressure sensitive member 4 and that is made of silicon, and a flat symmetrical adjusting member 6c that is joined to the cover member 5c and that is made of silicon. The base plate 2, the flow path member 3, and the pressure sensitive member 4 are as described with reference to FIGS. 1 to 4.

Two depressions 50c and 51 (pressure introduction chambers) are formed in a back surface of the cover member 5c that faces the pressure sensitive member 4 at locations at which the depressions 50c and 51 are placed over diaphragms 42 and 43 when the pressure sensitive member 4 and the cover member 5c are joined to each other. The depressions 50c and 51 have a square shape and are formed by removing a back-surface side of the cover member 5c so that a front-surface side of the cover member 5c remains. In addition, a groove 53c is formed in the back surface of the cover member 5c. The groove 53c is a pressure introduction path, one end of which communicates with a through hole 47 and the other end of which communicates with the depression 50c when the pressure sensitive member 4 and the cover member 5c are joined to each other. Further, a groove 54 is formed in the back surface of the cover member 5c. The groove 54 is a pressure introduction path, one end of which communicates with a through hole 46 and the other end of which communicates with the depression 51 when the pressure sensitive member 4 and the cover member 5c are joined to each other. A portion remaining at a front-surface side of a region at which the depression 50c of the cover member 5c is formed is a dummy diaphragm 56 having a compliance that is the same as that of the diaphragm 43.

As in the second embodiment, a depression 60 is formed in a back surface of the symmetrical adjusting member 6c that faces the cover member 5c.

Through holes 21, 31, and 47, the groove 53c, and the depression 50c constitute a first pressure introduction path for transmitting a first pressure to a first principal surface (an upper surface) of the diaphragm 42 and a first principal surface (a lower surface) of the dummy diaphragm 56. Through holes 20, 30, and 46, a groove 32 and the groove 54, and a depression 40 and the depression 51 constitute a second pressure introduction path for transmitting a second pressure to a second principal surface (a lower surface) of the diaphragm 42 and a first principal surface (an upper surface) of the diaphragm 43.

The pressure sensitive member 4 and the cover member 5c are directly joined to each other so that the depressions 50c and 51 of the cover member 5c are placed over the diaphragms 42 and 43 of the pressure sensitive member 4, the through hole 46 of the pressure sensitive member 4 and the groove 54 of the cover member 5c communicate with each other, and the through hole 47 of the pressure sensitive member 4 and the groove 53c of the cover member 5c communicate with each other. The cover member 5c and the symmetrical adjusting member 6c are directly joined to each other so that the depression 60 of the symmetrical adjusting member 6c is placed over the dummy diaphragm 56 of the cover member 5c.

As in FIG. 1, the sensor chip 10c and the diaphragm base 7 are joined to each other with an adhesive so that the through holes 20 and 21 of the sensor chip 10c communicate with the through holes 70 and 71 of the diaphragm base 7.

Even in the present embodiment, an equivalent circuit of the sensor element 1c is as shown in FIG. 9. Capacitors C1 to C4 are the same as those in the first embodiment. A capacitor C5 is obtained by modeling a compliance of the dummy diaphragm 56. Resistors R1, R2, R4, and R5 are the same as those in the first embodiment. R3 and R6 are a flow path resistance of the through holes 21, 31, and 47, the groove 53c, and the depression 50c, in which a first oil is sealed.

In the sensor element 1c of the present embodiment, since the groove 53c, the depressions 50c and 60, and the dummy diaphragm 56 are provided, the path for transmitting the first pressure and the path for transmitting the second pressure are symmetrically formed. Therefore, in the present embodiment, it is possible to measure differential pressure and absolute pressure at the same time with high sensitivity and to reduce the size of the sensor element, while suppressing the problems (A) and (B) above from occurring.

As in the first embodiment, in order to cause the path for transmitting the first pressure and the path for transmitting the second pressure to be perfectly symmetrically formed, it is desirable that the value of the capacitor C1 (the compliance of the barrier diaphragm 75) and the value of the capacitor C2 (the compliance of the barrier diaphragm 74) be equal to each other, and the value of the capacitor C4 (the compliance of the diaphragm 43) and the value of the capacitor C5 (the compliance of the dummy diaphragm 56) be equal to each other. In addition, it is desirable that the value of the resistor R1 (the flow path resistance of the depression 73 and the through hole 71) and the value of the resistor R2 (the flow path resistance of the depression 72 and the through hole 70) be equal to each other, the value of the resistor R3 (the flow path resistance of the through holes 21, 31, and 47, the groove 53c, and the depression 50c) and the value of the resistor R4 (the flow path resistance of the through holes 20 and 30, the groove 32, and the depression 40) be equal to each other, and the value of the resistor R5 (the flow path resistance of the through holes 20, 30, and 46, the groove 54, and the depression 51) and the value of the resistor R6 (the flow path resistance of the through holes 21, 31, and 47, the groove 53c, and the depression 50c) be equal to each other.

In the present embodiment, under the assumption that the path for transmitting the first pressure and the path for transmitting the second pressure are symmetrically formed, it is desirable that the amount of first oil that is sealed in the depression 73 and the through hole 71 of the diaphragm base 7 and the through holes 21, 31, and 47, the groove 53c, and the depression 50c of the sensor chip 10c be the same as the amount of second oil that is sealed in the depression 72 and the through hole 70 of the diaphragm base 7 and the through holes 20, 30, and 46, the grooves 32 and 54, and the depressions 40 and 51 of the sensor chip 10c.

However, in the present embodiment, since, unlike in the second embodiment, the symmetrical adjusting member 6c does not have a groove 62 and a depression 61, it is difficult to cause the amount of first oil and the amount of second oil to be the same.

Figure 16:
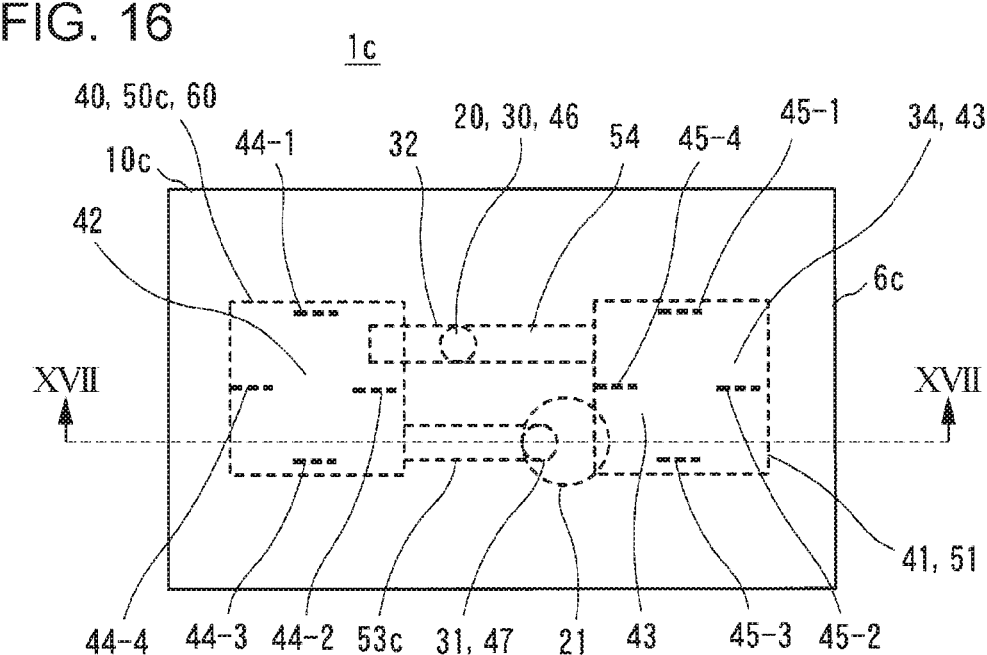
FIG. 16 is a plan view showing a different structure of the sensor chip of the sensor element according to the third embodiment of the present disclosure.
Figure 17:
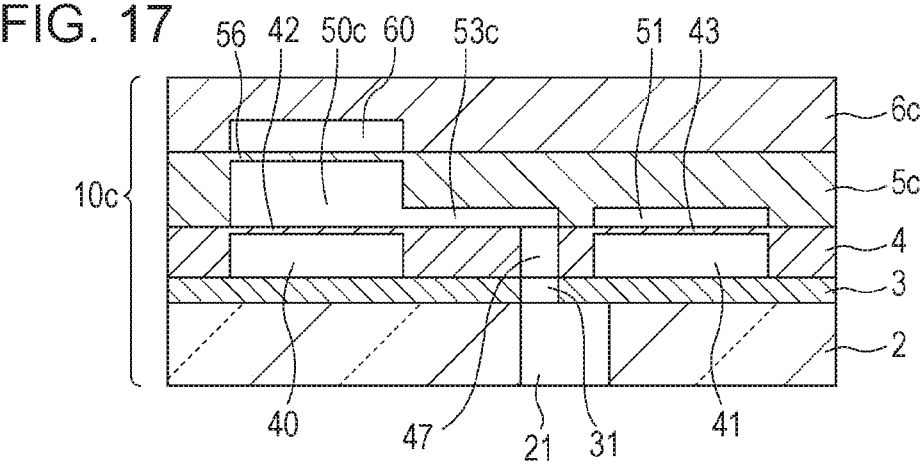
FIG. 17 is a sectional view showing a different structure of the sensor chip of the sensor element according to the third embodiment of the present disclosure.

Accordingly, under the assumption that the path for transmitting the first pressure and the path for transmitting the second pressure are symmetrically formed, as shown in FIGS. 16 and 17, the diameter of the through hole 21 of the base plate 2 may be made larger than the diameter of the through hole 20 to cause the amount of first oil and the amount of second oil to be the same or to cause the difference between the amount of first oil and the amount of second oil to be small. FIG. 17 is a sectional view along line XVII-XVII in FIG. 16.

Figure 18:
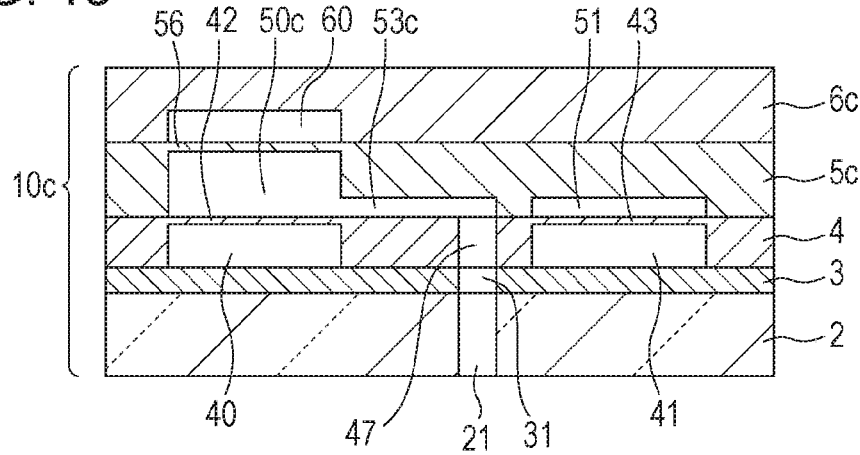
FIG. 18 is a sectional view showing a different structure of the sensor chip of the sensor element according to the third embodiment of the present disclosure.

In addition, under the assumption that the path for transmitting the first pressure and the path for transmitting the second pressure are symmetrically formed, as shown in FIG. 18, the volume of the depression 50c of the cover member 5c may be increased to cause the amount of first oil and the amount of second oil to be the same or to cause the difference between the amount of first oil and the amount of second oil to be small.

The structures shown in FIGS. 16 to 18 are applicable to the first and second embodiments. When the structure in FIG. 18 is applied to the first and second embodiments, the volumes of the depressions 50 and 50b are to be increased to cause the amount of first oil and the amount of second oil to be the same or to cause the difference between the amount of first oil and the amount of second oil to be small.

Fourth Embodiment

Figure 19:
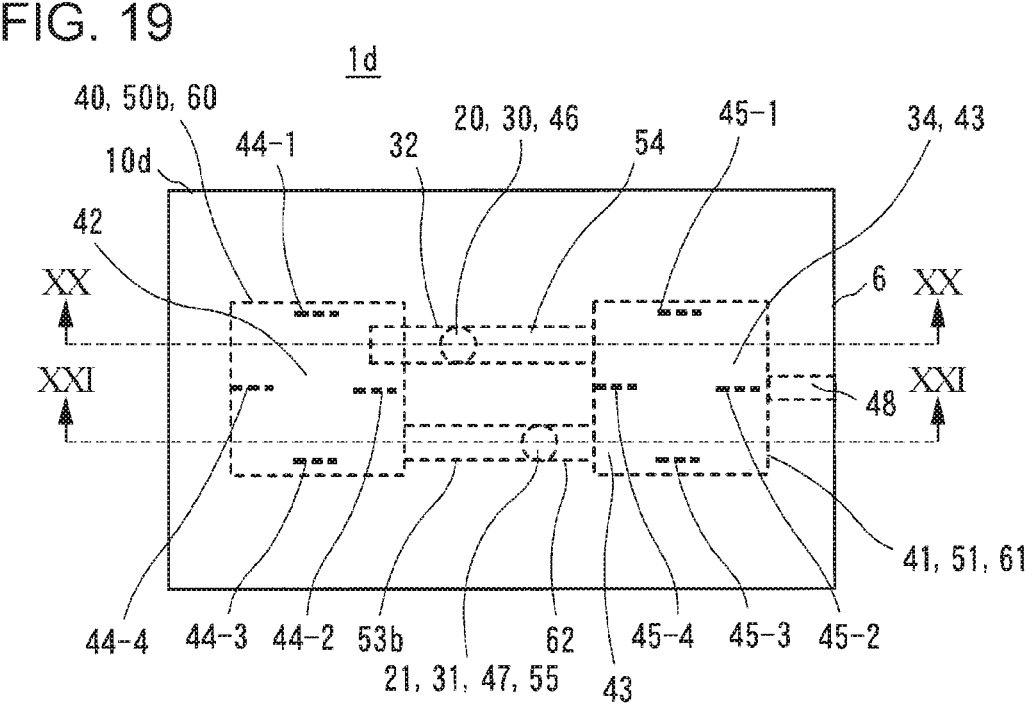
FIG. 19 is a plan view of a sensor chip of a sensor element according to a fourth embodiment of the present disclosure.
Figure 20:
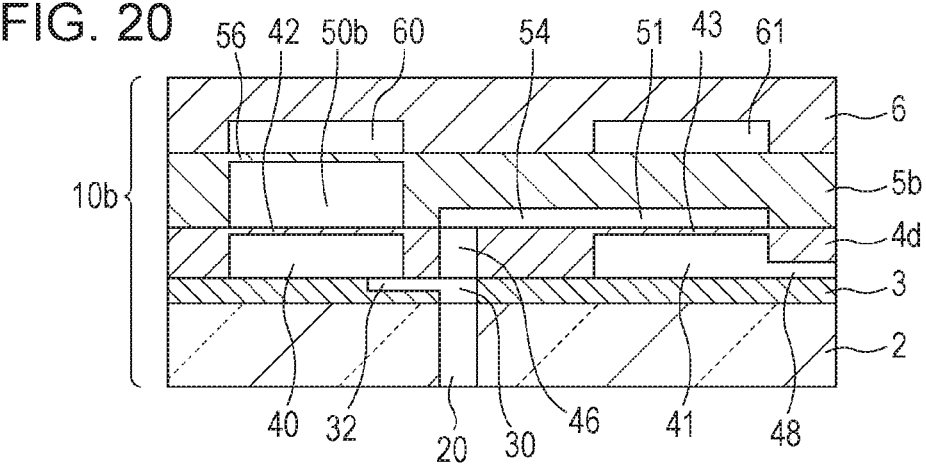
FIG. 20 is a sectional view of the sensor chip of the sensor element according to the fourth embodiment of the present disclosure.
Figure 21:
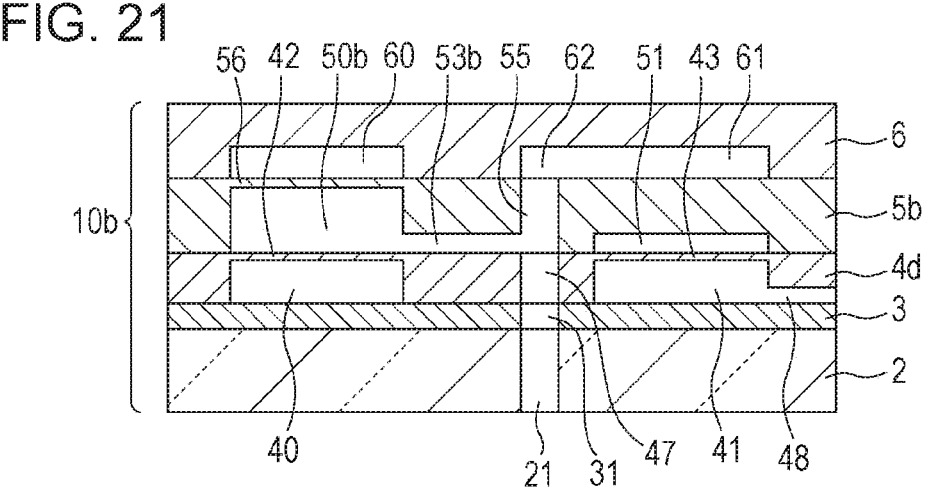
FIG. 21 is a sectional view of the sensor chip of the sensor element according to the fourth embodiment of the present disclosure.

In the second and third embodiments, it is possible to measure a gauge pressure of the second pressure. FIG. 19 is a plan view of a sensor element according to a fourth embodiment of the present disclosure. FIG. 20 is a sectional view along line XX in FIG. 19. FIG. 21 is a sectional view along line XXI-XXI in FIG. 19. A sensor element 1d of the present embodiment includes a diaphragm base and a sensor chip 10d mounted on the diaphragm base. Since the diaphragm base is as described with reference to FIG. 1, the diaphragm base is not described, and the same reference signs as those in FIG. 1 are used in the following description.

The sensor chip 10d includes a flat base plate 2 that is made of glass, a flat flow path member 3 that is joined to the base plate 2 and that is made of silicon, a flat pressure sensitive member 4d that is joined to the flow path member 3 and that is made of silicon, a flat cover member 5b that is joined to the pressure sensitive member 4d and that is made of silicon, and a flat symmetrical adjusting member 6 that is joined to the cover member 5b and that is made of silicon. The base plate 2, the flow path member 3, the cover member 5b, and the symmetrical adjusting member 6 are as described in the second embodiment.

The pressure sensitive member 4d is a member in which, in the pressure sensitive member 4 of the second embodiment, a groove 48 is formed in a back surface. The groove 48 is a pressure introduction path, one end of which communicates with a depression 41 and the other end of which opens in a side surface of the pressure sensitive member 4d. In the present embodiment, strain gauges 45-1 to 45-4 that are formed in a diaphragm 43 constitute together with an external circuit a Wheatstone bridge circuit for measuring gauge pressure. The Wheatstone bridge circuit for measuring gauge pressure is capable of measuring a gauge pressure of a second pressure that is applied to an upper surface of the diaphragm 43. The other structures are the same as those described in the second embodiment.

Therefore, in the present embodiment, it is possible to measure differential pressure and gauge pressure at the same time with high precision. Although, in the present embodiment, the structure for measuring gauge pressure is applied to the second embodiment, it goes without saying that the structure for measuring gauge pressure may be applied to the third embodiment.

The embodiments of the present disclosure have been described in detail above with reference to the attached drawings. However, the technical scope of the present disclosure is not limited to such embodiments. Obviously, any person having ordinary skill in the art with regard to the technical field of the present disclosure is capable of arriving at various modifications within the category of the technical idea described in the claims. Even such modifications obviously belong to the technical scope of the present disclosure.

What is claimed is:

1. A sensor element comprising:
   a sensor chip; and
   a diaphragm base that is joined to one surface of the sensor chip,
   wherein the sensor chip includes
      a first diaphragm for measuring a differential pressure between a first pressure and a second pressure,
      a second diaphragm for measuring an absolute pressure or a gauge pressure of the second pressure,
      a first pressure introduction path that transmits the first pressure to the first diaphragm, and
      a second pressure introduction path that transmits the second pressure to the first diaphragm and the second diaphragm,
   wherein the diaphragm base includes
      a third diaphragm that directly receives a fluid that is to be measured and that has the first pressure,
      a fourth diaphragm that directly receives a fluid that is to be measured and that has the second pressure,
      a third pressure introduction path that communicates with the first pressure introduction path to transmit the first pressure applied to the third diaphragm to the first pressure introduction path and the first diaphragm, and
      a fourth pressure introduction path that communicates with the second pressure introduction path to transmit the second pressure applied to the fourth diaphragm to the second pressure introduction path and the second diaphragm,
   wherein a first pressure transmission medium that is capable of transmitting the first pressure to the first diaphragm is sealed in from the first pressure introduction path to the third pressure introduction path, and a second pressure transmission medium that is capable of transmitting the second pressure to the first diaphragm and the second diaphragm is sealed in from the second pressure introduction path to the fourth pressure introduction path, and
   wherein when a movement amount of the first pressure transmission medium and a movement amount of the second pressure transmission medium are modeled by using an electrical charge, a flow speed of the first pressure transmission medium and a flow speed of the second pressure transmission medium are modeled by using an electrical current, the first pressure and the second pressure are modeled by using a voltage, compliances of the first diaphragm to the fourth diaphragm are modeled by using a capacitance, flow path resistances of the first pressure introduction path to the fourth pressure introduction path are modeled by using an electrical resistance, and when the transmission of the first pressure or the second pressure to the first diaphragm and the second diaphragm is indicated by an equivalent circuit, a path for transmitting the first pressure and a path for transmitting the second pressure are symmetrically formed.

2. The sensor element according to claim 1, further comprising:
   a reference chamber that is disposed at a second principal surface on a side opposite to a first principal surface of the second diaphragm for measuring the absolute pressure or for measuring the gauge pressure, the second pressure being transmitted to the second diaphragm; and
   a fifth diaphragm that is disposed so as to face the second diaphragm for measuring the absolute pressure or for measuring the gauge pressure with the reference chamber being interposed between the second diaphragm and the fifth diaphragm,
   wherein the first pressure introduction path transmits the first pressure to a second principal surface of the fifth diaphragm on a side opposite to a first principal surface of the fifth diaphragm facing the reference chamber, and
   wherein when the transmission of the first pressure or the second pressure to the first diaphragm, the second diaphragm, and the fifth diaphragm is indicated by the equivalent circuit, a path for transmitting the first pressure and a path for transmitting the second pressure are symmetrically formed.

3. The sensor element according to claim 1, further comprising:
   a first reference chamber that is disposed at a second principal surface on a side opposite to a first principal surface of the second diaphragm for measuring the absolute pressure or for measuring the gauge pressure, the second pressure being transmitted to the second diaphragm;
   a sixth diaphragm that is disposed so as to face the first diaphragm for measuring the differential pressure with the first pressure introduction path that transmits the first pressure to the first diaphragm for measuring the differential pressure being interposed between the first diaphragm for measuring the differential pressure and the sixth diaphragm; and
   a second reference chamber that is disposed at a second principal surface of the sixth diaphragm on a side opposite to a first principal surface of the sixth diaphragm facing the first pressure introduction path,
   wherein when the transmission of the first pressure or the second pressure to the first diaphragm, the second diaphragm, and the sixth diaphragm is indicated by the equivalent circuit, a path for transmitting the first pressure and a path for transmitting the second pressure are symmetrically formed.

4. The sensor element according to claim 1, wherein an amount of the first pressure transmission medium with which the first pressure introduction path is filled and an amount of the second pressure transmission medium with which the second pressure introduction path is filled are the same.

5. The sensor element according to claim 4, further comprising:
   a liquid amount adjustment chamber that is provided in the first pressure introduction path so that the amount of the first pressure transmission medium and the amount of the second pressure transmission medium are the same.

\* \* \* \* \*